US008825352B2

(12) United States Patent
Masutani

(10) Patent No.: US 8,825,352 B2
(45) Date of Patent: Sep. 2, 2014

(54) TRAFFIC DATA PREDICTION DEVICE, TRAFFIC DATA PREDICTION METHOD AND COMPUTER PROGRAM

(71) Applicants: Denso IT Laboratory, Inc., Tokyo (JP); Denso Corporation, Aichi (JP)

(72) Inventor: Osamu Masutani, Tokyo (JP)

(73) Assignees: Denso IT Laboratory, Inc., Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 13/799,892

(22) Filed: Mar. 13, 2013

(65) Prior Publication Data

US 2014/0100766 A1 Apr. 10, 2014

(30) Foreign Application Priority Data

Mar. 29, 2012 (JP) ................................ 2012-078099

(51) Int. Cl.
*G08G 1/00* (2006.01)
*G06F 17/30* (2006.01)

(52) U.S. Cl.
USPC ....................... 701/117; 701/118; 340/995.13

(58) Field of Classification Search
USPC ........ 701/117, 118, 2; 340/995.13; 455/414.3
See application file for complete search history.

(56) References Cited

U.S. PATENT DOCUMENTS 4,931,941 A * 6/1990 Krishnan ...................... 701/118
8,255,145 B2 8/2012 Murata et al.
2007/0198179 A1 8/2007 Ishikawa
2008/0088424 A1 4/2008 Imura et al.
2011/0160987 A1 * 6/2011 Wu et al. ....................... 701/117

FOREIGN PATENT DOCUMENTS

JP 08-287393 A 11/1996
JP 2005-208032 A 8/2005
JP 2007-218777 A 8/2007
JP 2007-219633 A 8/2007
JP 2008-094213 A 4/2008
JP 2012-038092 A 2/2012

OTHER PUBLICATIONS

Japanese Office Action for Application No. 2012-078099 dated Jan. 21, 2014.

* cited by examiner

*Primary Examiner* — Tan Q Nguyen
(74) *Attorney, Agent, or Firm* — Pearne & Gordon LLP

(57) ABSTRACT

A traffic data prediction device includes an original link traffic data storage unit (103) for storing traffic data per original link as a predetermined road link, an extended link generation unit (104) for generating an extended link from the original links, and an extended link traffic data prediction unit (108) for predicting traffic data per extended link generated in the extended link generation unit (104) by use of traffic data per original link. The extended link generation unit (104) decides the original links for generating the extended link based on data indicating a predictive accuracy of traffic data in a combined link combining the selected original links, and generates the extended link made of the decided original links as elements.

13 Claims, 10 Drawing Sheets

Fig.2

| | |
|---|---|
| ORIGINAL LINK ID | o1 |
| START POINT NODE ID | n1 |
| START POINT NODE POSITION COORDINATE | (Ex1、Ny1) |
| END POINT NODE ID | n2 |
| END POINT NODE POSITION COORDINATE | (Ex2、Ny2) |
| ORIGINAL LINK LENGTH | d1 |
| ⋮ | ⋮ |

Fig.5

| | |
|---|---|
| EXTENDED LINK ID | e1 |
| ORIGINAL LINK ID | o15 |
| ORIGINAL LINK LENGTH | d15 |
| ORIGINAL LINK ID | o21 |
| ORIGINAL LINK LENGTH | d21 |
| ORIGINAL LINK ID | o27 |
| ORIGINAL LINK LENGTH | d27 |
| EXTENDED LINK LENGTH | D1 |
| ⋮ | ⋮ |

TRAFFIC DATA PREDICTION DEVICE, TRAFFIC DATA PREDICTION METHOD AND COMPUTER PROGRAM

CROSS-REFERENCE TO RELATED APPLICATIONS

The present application claims the priority of patent application No. 2012-078099 filed on Mar. 29, 2012 in Japan, the contents of which are incorporated herein by reference.

BACKGROUND OF THE INVENTION

1. Field of the Invention

The present invention relates to a traffic data prediction device, a traffic data prediction method and a computer program for predicting traffic data in a road section.

2. Description of Related Art

Conventionally, in the field of ITS (Intelligent Transport System), there is known a service that predicts link traffic data such as required traveling time in each link (link traveling time) and provides it to a car navigation device for vehicle's route guidance and the like. As a technique for realizing such a service, there are proposed a technique for predicting link traffic data based on traffic data transmitted from VICS (Vehicle Information & Communication System, trademark) or sensing data of a probe car configuring a probe car system, and transmitting the predicted data to a car navigation device, and its related techniques (see Japanese Patent Application Laid-Open No. 2005-208032 and U.S. Pat. No. 8,255,145). Herein, "link" refers to a road section connecting nodes as points on a road such as intersections, and typically a plurality of links are sequentially connected to configure one road.

SUMMARY OF THE INVENTION

Since a predicted value per link is individually calculated for predicting link traffic data such as traveling time with the conventional technique, an enormous amount of calculations is required for all the links whenever the prediction is updated (for example, VICS traffic data or probe car's sensing data is acquired every five minutes). In a case of the link traffic data prediction using probe car's sensing data, particularly in a link with fewer passages of system-compatible vehicles, data enough to calculate a predicted value cannot be accumulated, and predicted traffic data to be provided is less reliable.

The present invention has been made in terms of the above problems, and an object thereof is to provide a traffic data prediction device, a traffic data prediction method and a computer program capable of predicting traffic data such as link traveling time with a high accuracy while reducing the amount of calculations.

A traffic data prediction device comprises an original link traffic data storage unit for storing traffic data per original link as a predetermined road link, an extended link generation unit for generating an extended link from the original links, and an extended link traffic data prediction unit for predicting traffic data per extended link generated in the extended link generation unit by use of traffic data per original link, wherein the extended link generation unit decides the original links for generating the extended link based on data indicating a predictive accuracy of traffic data in a combined link combining the selected original links, and generates the extended link made of the decided original links as elements.

According to the present invention, there is an advantage that a prediction can be made with a high accuracy while reducing the amount of calculations for predicting traffic data.

The present invention has other aspects as described later. Thus, the disclosure of the present invention intends to provide part of the present invention, and does not intend to limit the scope of the invention described and claimed herein.

BRIEF DESCRIPTION OF THE DRAWINGS

FIG. 2 is a diagram illustrating exemplary original link map data stored in an original link map data storage unit according to the embodiment of the present invention;

FIG. 5 is a diagram illustrating exemplary extended link map data stored in an extended link map data storage unit according to the embodiment of the present invention;

DESCRIPTION OF EMBODIMENTS

Figure 1:
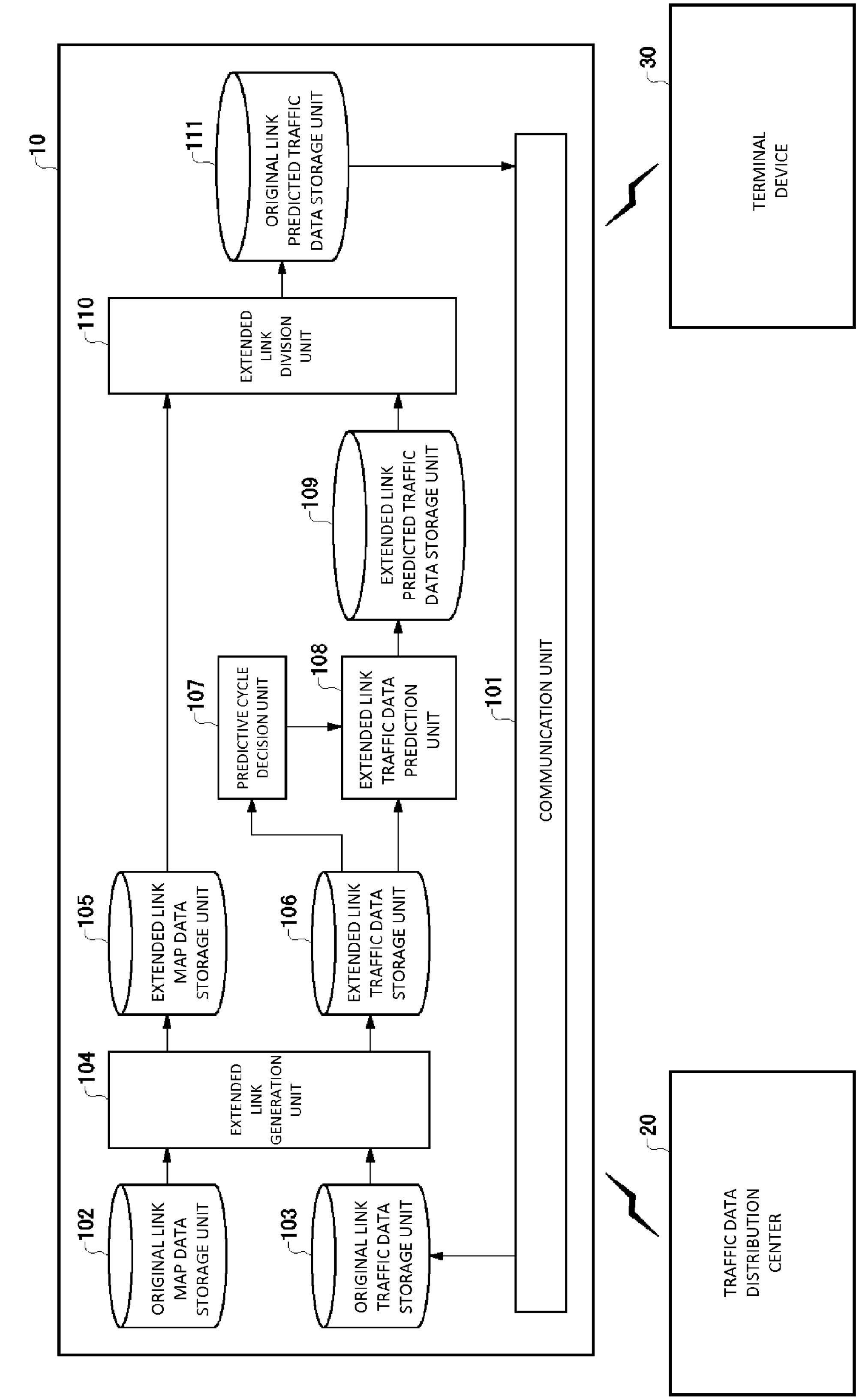
FIG. 1 is a block diagram illustrating a structure of a traffic data prediction device according to an embodiment of the present invention.

The present invention will be described below in detail. An embodiment of the present invention described later is merely exemplary, and the present invention may be modified in various aspects. Thus, the specific structures and functions disclosed below do not intend to limit the scope of claims.

A traffic data prediction device according to the embodiment of the present invention comprises an original link traffic data storage unit for storing traffic data per original link as a predetermined road link, an extended link generation unit for generating an extended link from the original links, and an extended link traffic data prediction unit for predicting traffic data per extended link generated by the extended link generation unit by use of the traffic data per original link, wherein the extended link generation unit decides the original links for generating the extended link based on data indicating a predictive accuracy of traffic data of a combined link combining the selected original links, and generates the extended link made of the decided original links as elements.

With the structure, an extended link on which a predictive accuracy is reflected is generated and traffic data is predicted in units of generated extended link, thereby increasing a unit of the traffic data prediction without lowering the predictive accuracy.

In the traffic data prediction device, the extended link traffic data prediction unit may predict traffic data per extended link based on traffic data per extended link which is calculated by use of the original link traffic data corresponding to the original links as elements of the generated extended link.

With the structure, traffic data per extended link can be calculated by use of the accumulated original traffic data and a prediction can be made based on the calculated traffic data per extended link, thereby predicting the traffic data per extended link efficiently and accurately.

The traffic data prediction device may further comprise an extended link division unit for dividing the traffic data per extended link predicted by the extended link traffic data prediction unit and assigning the divided traffic data to each of the original links as elements of the extended link.

With the structure, even when traffic data is predicted per extended link, predicted traffic data can be provided like when traffic data is predicated per original link before the extended link is generated.

In the traffic data prediction device, the extended link division unit divides the traffic data per extended link predicted by the extended link traffic data prediction unit according to an attribute value of each of the original links as elements of the extended link.

With the structure, predicted traffic data per extended link is divided according to an attribute value such as link length or link average traveling time of each original link configuring the extended link, so that the predicted traffic data per extended link may be given back to the traffic data in units of original link similarly as when traffic data is predicted in units of original link.

In the traffic data prediction device, the extended link generation unit may predict traffic data of a combined link, thereby calculating data indicating a predictive accuracy of the traffic data of the combined link.

With the structure, an extended link can be generated by simulating a predictive accuracy of a combined link as an extended link candidate, thereby predicting traffic data of the extended link with a high accuracy.

In the traffic data prediction device, the extended link generation unit may predict traffic data of a combined link by use of traffic data per combined link calculated by use of traffic data of original links configuring the combined link.

With the structure, traffic data per combined link can be calculated by use of accumulated original traffic data and a predictive accuracy can be simulated by use of the calculated traffic data per combined link, thereby efficiently generating an extended link.

In the traffic data prediction device, the extended link generation unit may select original links configuring a combined link based on data indicating a predictive accuracy of traffic data per original link.

With the structure, original links with a high predictive accuracy may be selected and assumed as candidates of an extended link, thereby preventing the predictive accuracy of traffic data of the generated extended link from lowering.

In the traffic data prediction device, a combined link may be configured of adjacent original links sequentially selected and combined.

With the structure, an extended link to be generated is a consecutive road link, and thus a prediction of traffic data per extended link may be used as it is without dividing the extended link, for example.

In the traffic data prediction device, the extended link generation unit may calculate data indicating a predictive accuracy of traffic data in a combined link whenever a selected original link is newly combined, and may decide the newly-combined original link as an original link for generating the extended link when the predictive accuracy of the traffic data in the combined link does not decrease.

With the structure, a predictive accuracy is simulated whenever an original link is combined, and the original link is decided to be added when the predictive accuracy does not decrease, thereby generating an extended link for more accurate prediction.

The traffic data prediction device further comprises a predictive cycle decision unit for deciding a cycle at which the traffic data per extended link is to be predicted, and the extended link traffic data prediction unit may predict traffic data per extended link at the cycle decided by the predictive cycle decision unit.

With the structure, for example, a predictive cycle or a time interval is increased, thereby reducing a prediction frequency and reducing the amount of calculations even further.

In the traffic data prediction device, the predictive cycle decision unit may decide the cycle based on data indicating a predictive accuracy when traffic data per extended link is predicted at a different cycle.

With the structure, a predictive cycle is decided based on the simulation at a different cycle, thereby reducing a prediction frequency without lowering a predictive accuracy.

A traffic data prediction method according to the embodiment of the present invention includes a step of generating an extended link from original links as predetermined road links, and a step of predicting traffic data per extended link generated by the step of generating an extended link by use of the traffic data per original link acquired from the original link traffic data storage unit storing the traffic data per original link, wherein the step of generating an extended link decides original links for generating the extended link based on data indicating a predictive accuracy of traffic data in a combined link combining the selected original links, and generates the extended link made of the decided original links as elements.

With the structure, an extended link on which a predictive accuracy is reflected is generated and traffic data is predicated in units of generated extended link, thereby increasing a unit of the traffic data prediction without lowering the predictive accuracy.

Still another aspect of the present invention provides a computer-readable storage medium storing a program for causing a computer to execute the traffic data prediction method.

The embodiment of the present invention will be described below with reference to the drawings. FIG. 1 is a block diagram illustrating the structure of the traffic data prediction device according to the present embodiment. A traffic data prediction device 10 includes a communication unit 101, an original link map data storage unit 102, an original link traffic data storage unit 103, an extended link generation unit 104, an extended link map data storage unit 105, an extended link traffic data storage unit 106, a predictive cycle decision unit 107, an extended link traffic data prediction unit 108, an extended link predicted traffic data storage unit 109, an extended link division unit 110, and an original link predicted traffic data storage unit 111.

The traffic data prediction device 10 is connected to a traffic data distribution center 20 via the communication unit 101, and acquires traffic data of each link every predetermined time such as every five minutes. The traffic data prediction device 10 is connected to a terminal device 30 via the communication unit 101, and transmits original link predicted traffic data stored in the original link predicted traffic data storage unit 111 in response to a request from the terminal device 30. The traffic data distribution center 20 distributes traffic data generated based on VICS data or probe car's sensing data, for example.

FIG. 2 is a diagram illustrating exemplary original link map data stored in the original link map data storage unit 102. As illustrated in FIG. 2, the original link map data contains information on a road link contained in map data, such as original link ID, start point node ID, end point node ID, start point node position coordinate, end point node position coordinate and original link length. The original link map data may contain other information on each original link.

The original link ID is data for identifying each link, and is expressed by a series of numbers assigned to the respective links, for example. The start point node ID is data for identifying a start point node of a link, and the end point node ID is data for identifying an end point node of the link. In this way, the start point node and the end point node are discriminated from each other in each link, thereby specifying a link direction (upstream or downstream). The start point node position coordinate and the end point node position coordinate are data indicating the respective positions of the start point node and the end point node of the link by latitude and longitude, for example. The original link length is a length of a road between the start point node and the endpoint node of the link.

Figure 3:
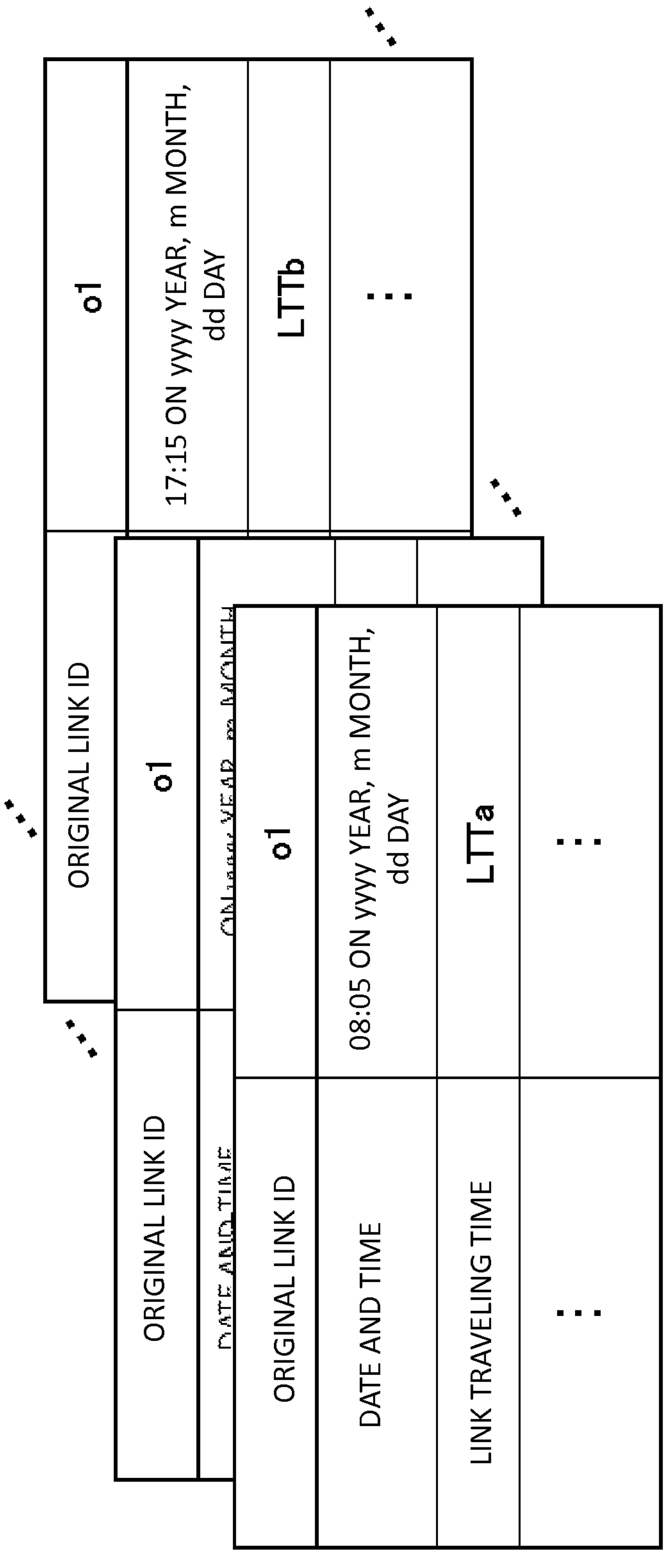
FIG. 3 is a diagram illustrating exemplary original link traffic data stored in an original link traffic data storage unit according to the embodiment of the present invention.

The original link traffic data storage unit 103 stores traffic data per original link acquired via the communication unit 101. FIG. 3 is a diagram illustrating exemplary stored original link traffic data. As illustrated in FIG. 3, the original link traffic data contains original link ID, date and time data, and original link traveling time data. As described above, the traffic data prediction device 10 acquires traffic data from the traffic data distribution center 20 at a predetermined time interval, and thus the original link traffic data storage unit 103 may be added with new data at the predetermined time interval or may be updated, for example, old data is deleted therefrom.

The original link ID corresponds to the original link ID stored in the link map data storage unit 102. The date and time data indicates at which point of time the original link traffic data is. The original link traveling time data indicates a required traveling time of the original link ID. The original link traffic data may contain data such as a vehicle average speed in the original link, and in this case, the original link traveling time may be found by dividing the link length stored in the original link map data storage unit 102 by the link traveling speed.

The extended link generation unit 104 reads the original link map data storage unit 102 and the original link traffic data storage unit 103, generates an extended link from the original links assigned with individual IDs in the original link map data storage unit 102 by use of the original link map data and the original link traffic data, and stores the data on the generated extended link in the extended link map data storage unit 105. The extended link generation unit 104 further generates extended link traffic data per generated extended link based on the original link traffic data, and stores the generated extended link traffic data in the extended link traffic data storage unit 106.

The predictive cycle decision unit 107 uses the extended link traffic data stored in the extended link traffic data storage unit 106 to decide a predictive cycle of the extended link traffic data prediction unit 108, or a time interval at which a prediction is made. For the predictive cycle, the same cycle may be set for all the extended links in association with generation of the extended link traffic data, and in this case, the predictive cycle decision unit 107 may not be provided.

The extended link traffic data prediction unit 108 predicts traffic data such as link traveling time per extended link from the extended link traffic data accumulated in the extended link traffic data storage unit 106, and stores the predicted data in the extended link predicted traffic data storage unit 109. The extended link traffic data prediction unit 108 repeatedly calculates the predicted data according to the predictive cycle decided in the predictive cycle decision unit 107 or the predetermined predictive cycle.

The extended link division unit 110 divides the extended link into original links configuring each extended link, assigns the predicted traffic data stored in the extended link predicted traffic data storage unit 109 to the divided links, and stores it in the original link predicted traffic data storage unit 111.

The original link predicted traffic data storage unit 111 stores therein an original link ID, a predicted value of the link traffic data such as traveling time in the link, and date and time information indicating when the predicted value of the traffic data was predicted for. The link ID in the link predicted traffic data storage unit 111 is preferably matched with the link ID in the original link map data storage unit 102 for the same road link, but may be associated therewith with mutually-different IDs by the position data or the like.

The traffic data prediction device 10 retrieves a program for realizing each function from a computer-readable storage medium and stores the same.

The operations of the traffic data prediction device 10 with the structure will be described below with reference to the flowchart of FIG. 4 assuming that a link traveling time is predicted.

At first, the extended link generation unit 104 uses the original link map data read from the original link map data storage unit 102 and the original link traffic data read from the original link traffic data storage unit 103 to generate an extended link (step S11). In the present embodiment, the extended link is generated by referring to the start point node IDs and the end point node IDs contained in the original link map data and sequentially combining the adjacent original links. That is, the generation of an extended link is a process of deciding how far the original links are combined. The decision is made based on a simulation result of the traffic data prediction over the combined original links whenever an original link is combined. The simulation is made by use of the original link traffic data. The generated extended link is stored in the extended link map data storage unit 105. A flow of the extended link generation processing will be described below in detail.

FIG. 5 is a diagram illustrating exemplary extended link map data stored in the extended link map data storage unit 105. As illustrated in FIG. 5, the extended link map data contains data on an extended link ID, an original link ID, a link length of each original link, and a link length of an extended link. The extended link ID is data for identifying each extended link generated in step S11. The original link ID is data for identifying an original link contained in the extended link ID, and corresponds to the original link ID stored in the original link map data storage unit 102. The extended link length is calculated by adding the link lengths of the original links contained in the extended link.

The extended link generation unit 104 reads the original link traffic data storage unit 103 and generates extended link traffic data as traffic data of each extended link generated in step S11 (step S12). In the present embodiment, the extended link traveling time contained in the extended link traffic data is calculated by adding the traveling time per original link contained in each extended link. The processing of adding the traveling times is performed based on the date and time data of the original link traffic data per extended link. That is, when n items of original link traffic data are present at five-minute intervals, n items of extended link traffic data are generated at five-minute intervals. As described above, the original link traffic data storage unit 103 is updated at a predetermined time interval, and thus the extended link traffic data is correspondingly added. Thus, the processing in step S12 may be repeated at a predetermined time interval along with update of the original link traffic data storage unit 103. The generated extended link traffic data is stored in the extended link traffic data storage unit 106.

Figure 6:
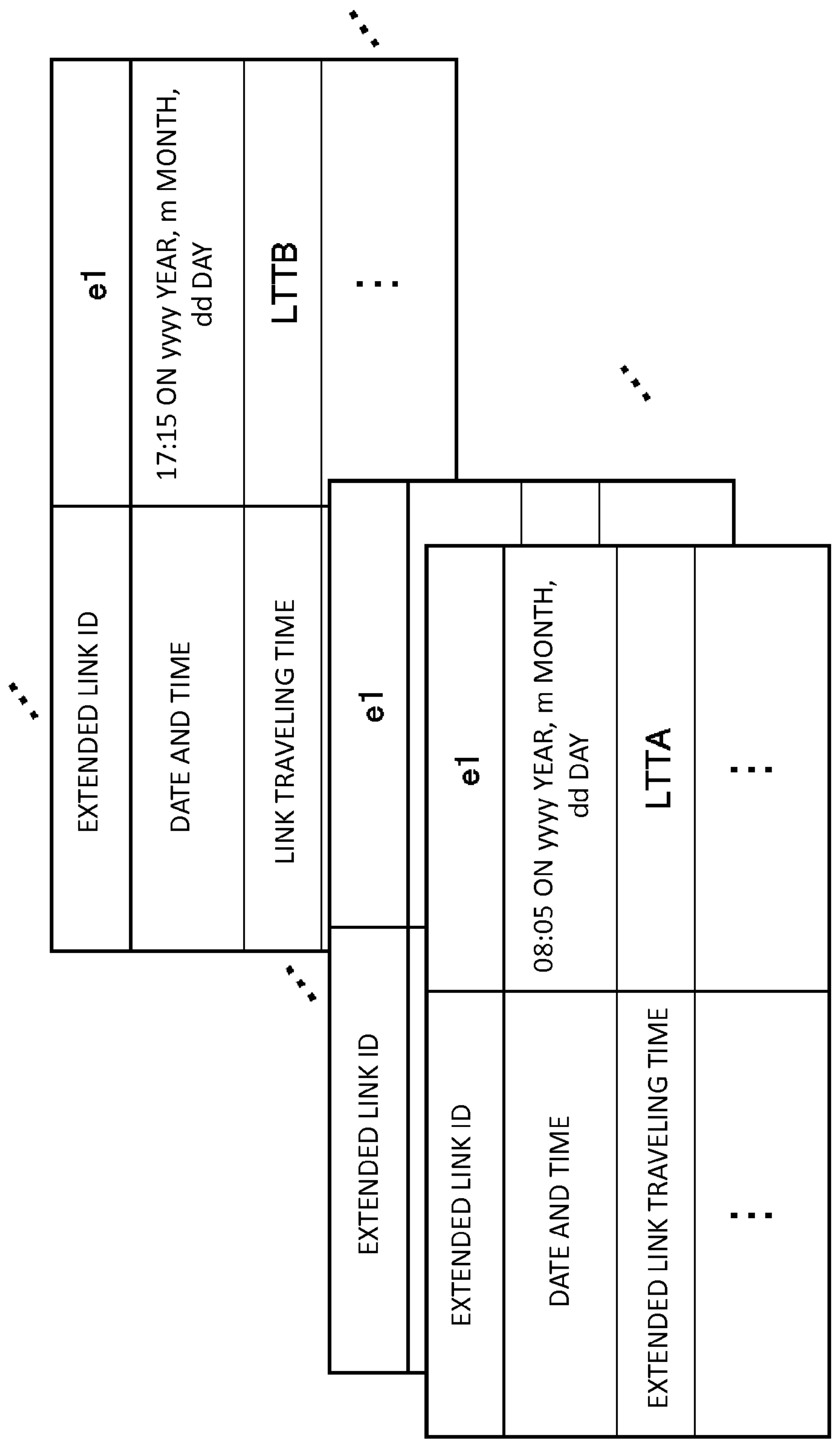
FIG. 6 is a diagram illustrating exemplary extended link traffic data stored in an extended link traffic data storage unit according to the embodiment of the present invention.

FIG. 6 is a diagram illustrating exemplary data stored in the extended link traffic data storage unit 106. As illustrated in FIG. 6, the extended link traffic data contains an extended link ID, date and time data, extended link traveling time data. In step S11, an extended link containing only one original link, which is not combined with other original links, may be generated. In this case, the extended link traveling time data of the extended link traffic data is equal to the link traveling time data of the original link.

The extended link traffic data prediction unit 108 predicts traffic data per extended link based on the extended link traffic data generated in step S12 (step S13). As described above, in step S12, as much extended link traffic data as date and time data is generated in association with each item of date and time data of the original link traffic data. In step S13, the data accumulated over time is used as the traffic data of each extended link in this way thereby to predict traffic data of each extended link after a predetermined time corresponding to the predictive cycle.

The traffic data can be predicted by various methods. In the present embodiment, a prediction is made by use of AR (Auto Regression) model as one time-sequential analysis method. The AR model expresses an output at a certain point of time as a linear combination of past outputs, and can describe a traveling time $T_t$ in an extended link at time t as the following:

$$T_t = \sum_{k=1}^{t-1} A_k T_{t-k} + \varepsilon_t$$

Herein, $A_k$ is an AR parameter (constant), and needs to be previously learned for defining each $A_k$. $\epsilon_t$ is an error term.

When the traffic data is predicted by use of the AR model, a plurality of items of traffic data need to be input on a date before the prediction date. As described above, the extended link traffic data storage unit 106 stores therein a plurality of items of traffic data with different dates for the same extended link. Any data may be input for predicting the extended link traffic data. In the present embodiment, the extended link traffic data for one hour immediately before the prediction point of time is read from the extended link traffic data storage unit 106 and is used for prediction.

Figure 7:
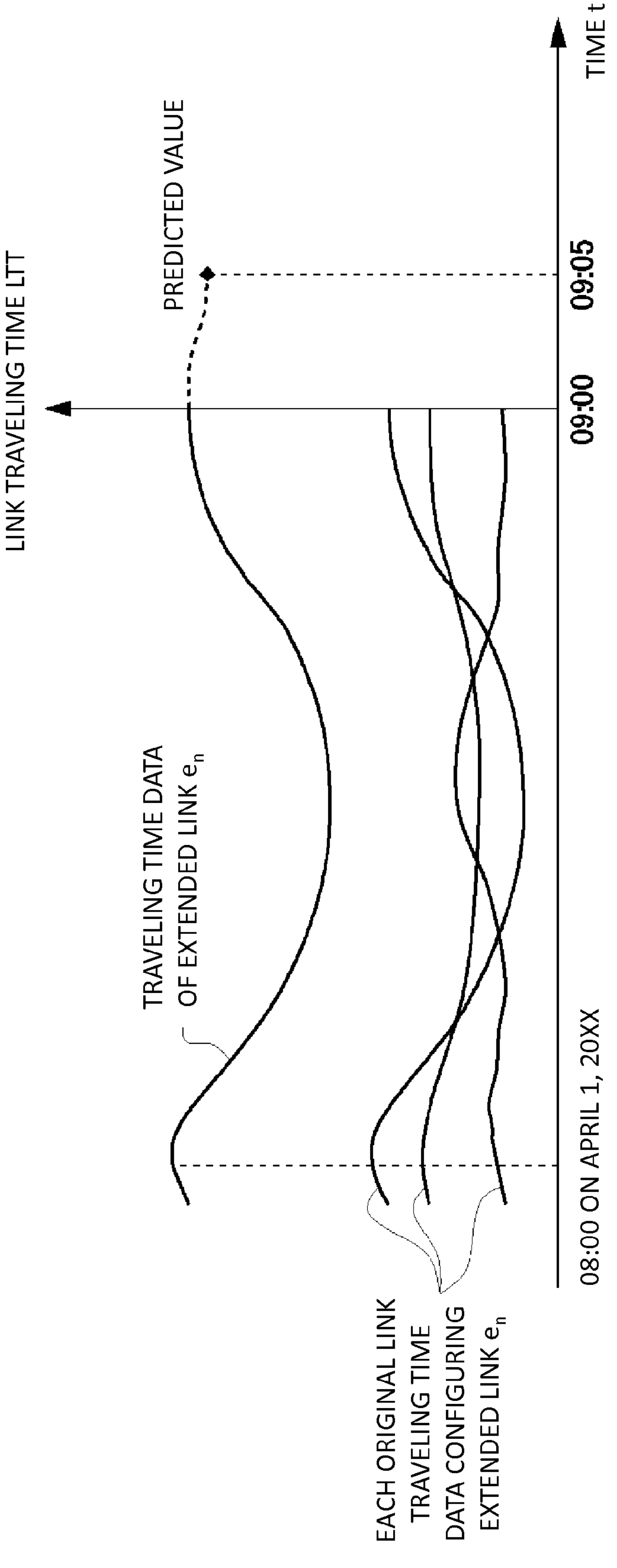
FIG. 7 is a diagram for explaining prediction of extended link traffic data according to the embodiment of the present invention.

For example, in step S12, it is assumed that the extended link traffic data is newly generated at five-minute intervals at 0 minute, 5 minutes, . . . , every hour along with update of the original link traffic data storage unit 103. In this case, for predicting a traveling time of an extended link $e_n$ at 9:05 am on Apr. 1, 20xx, as illustrated in FIG. 7, a total of 13 items of extended link traveling time data at five-minute intervals from 8:00 am. to 9:00 am on the day, which corresponds to the data for one hour before the prediction point of time, is used.

The extended link traffic data prediction unit 108 predicts the extended link traveling time for all the extended links. Each calculated predicted value is associated with an extended link ID, and is stored in the extended link predicted traffic data storage unit 109.

Then, the extended link is divided in step S14. Thereby, the extended link returns to the original links, and the extended link predicted traffic data stored in the extended link predicted traffic data storage unit 109 is converted into predicted traffic data per original link to be stored in the original link predicted traffic data storage unit 111.

Specifically, the extended link division unit 110 reads the extended link predicted traffic data storage unit 109 and the extended link map data storage unit 105, and the predicted value of the traveling time per extended link, which is stored in the extended link predicted traffic data storage unit 109, is divided corresponding to a ratio of the length of each original link as an element of the extended link, which is stored in the extended link map data storage unit 105. The divided link traveling time predicted value is associated with the original link ID again, and is stored in the original link predicted traffic data storage unit 111. The predicted value may be divided by use of the data stored in the original link traffic data storage unit 103 at a ratio of the average traveling time of each original link.

As described above, the processing after step S12 may be repeated along with update of the original link traffic data storage unit 103. In the present embodiment, the processing ends on power-off or processing end interruption.

According to the present embodiment, the original links, each of which is a unit of the link traffic data such as link traveling time distributed from the traffic data distribution center 20, are combined to generate an extended link, and the extended link is a unit for predicting the traffic data such as traveling time. Thus, as compared with the conventional technique in which traffic data is predicted in units of original link, the number of predicted values to be calculated is less at each point of time for prediction, and consequently the amount of calculations for predicting the traffic data can be reduced.

Figure 8:
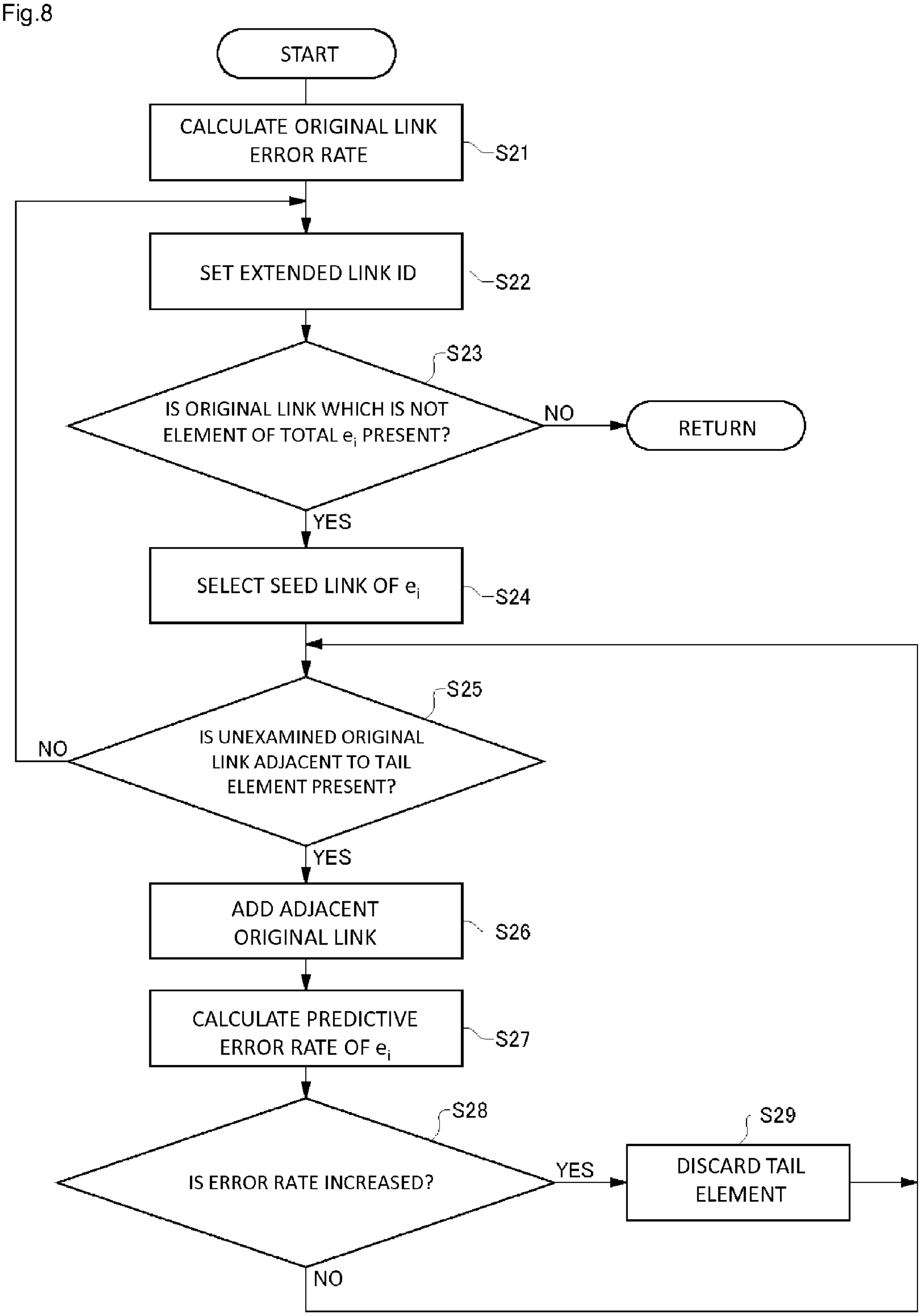
FIG. 8 is a flowchart for explaining the operations of an extended link generation unit according to the embodiment of the present invention.

Then, a flow of the extended link generation processing by the extended link generation unit 104 will be described by way of the flowchart of FIG. 8 and specific examples of FIGS. 9A to 9F. A case in which traffic data is a link traveling time will be described herein.

The original link traffic data storage unit 103 is first read, and a predictive error rate is calculated for all the original links (step S21). The predictive error is an error between a predicted value and a true value or an actual link traveling time, and a predictive error rate is found by |(predicted value-true value)|/(true value). The predictive error rate is found in the present embodiment, but other method capable of obtaining an index capable of evaluating a predictive accuracy per original link may be employed, and an absolute difference between a true value and a predicted value or RMSE (Root Mean-Square Error) may be employed, for example.

Figure 4:
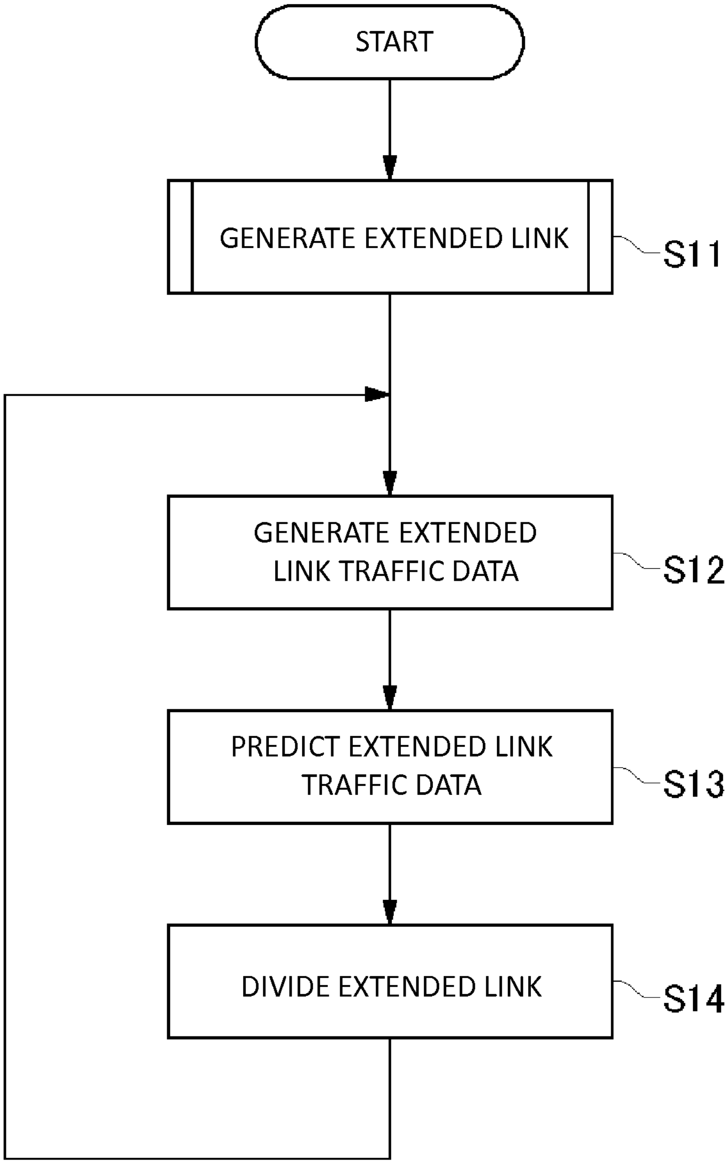
FIG. 4 is a flowchart illustrating the operations of the traffic data prediction device according to the embodiment of the present invention.

The predicted value in step S21 can be calculated by use of the actual past traffic data by the AR model similarly as in step S13 in the flowchart of FIG. 4. A predicted value calculated in this step is used to generate an extended link, and is not provided to the terminal device 30. Thus, in the present embodiment, the traffic data is previously distributed from the traffic data distribution center 20, and the traveling time data in an original link at a past point of time p, which is stored in the original link traffic data storage unit 103, is predicted by use of the traveling time data of the link at the earlier points of time p-1, p-2, . . . , to assume as a predicted value for calculating an error. The predictive error rate is calculated based on the predicted value and the actual traveling time data of the same original link which is stored in the original link traffic data storage unit 103 and whose date and time data is p.

Figure 9A:
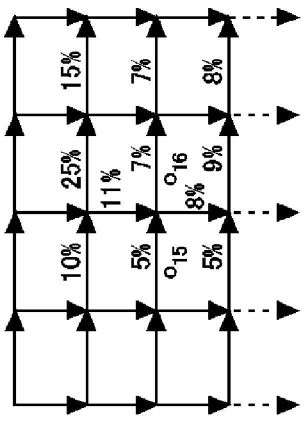
FIG. 9A to FIG. 9F are diagrams for explaining exemplary generation of an extended link according to the embodiment of the present invention.

Whenever a predictive error rate is calculated per original link, the extended link generation unit 104 holds the link ID of the original link and the error rate in an associated manner. FIG. 9A is a diagram schematically illustrating the state. In FIG. 9A, each arrow indicates each original link, the tip of the arrow corresponds to the end point node of the original link, the other end of the arrow corresponds to the start point node of the original link, the direction opposite to the tip of the arrow is the downstream direction, and its reverse is the upstream direction.

When the predictive error rates are calculated for all the original links, one extended link ID $e_i$ generated by the following processing is set (step S22). The initial value of i is 1, and is incremented by 1 whenever the processing returns to step S22.

Then, for all the extended links, a determination is made as to whether an original link which is not an element of any extended link $e_i$ is present (step S23). When it is determined that an original link which is not an element of any extended link is not present, or when it is determined that all the original links are elements of at least one extended link (NO in step S23), all the original links are assumed to be converted to an extended link for prediction, and the extended link generation processing ends.

On the other hand, when it is determined that an original link which is not an element of any extended link is present (YES in step S23), a seed link of the extended link $e_i$ is selected (step S24). Herein, "seed link" is an original link as an initial element of the extended link $e_i$, and the start point node of the original link is the start point node of the extended link $e_i$. When a plurality of original links which are not elements of any extended link are present, an original link with the smallest predictive error rate is selected as a seed link. The seed link may be selected based on other parameters such as the traffic amount, the number of probes, and a degree of congestion.

Figure 9B:
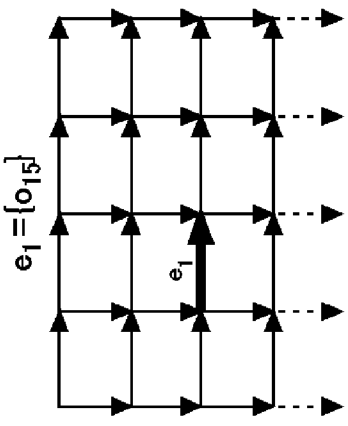

FIG. 9B illustrates that an original link with the error rate of 5% (original link ID=$o_{15}$) is selected as a seed link of an extended link $e_1$.

Then, a determination is made as to whether an unexamined original link adjacent to the tail element of the extended link $e_i$ is present (step S25). The tail element of the extended link $e_1$ refers to an original link last added to the extended link $e_i$ made of one or more original links, and the original link adjacent to the tail element refers to an element whose start point node matches with the endpoint node of the original link as the tail element. The unexamined original link is an original link which has not been selected in step S26 described later for generating the extended link $e_i$. For an adjacent link, unlike the present embodiment, a determination may be made on the presence of an adjacent link in the upstream direction or an unexamined original link which has, as the end point node, a node matching with the start point node of the original link as the tail element of the extended link $e_i$.

When it is determined that an unexamined original link adjacent to the tail element of the extended link $e_i$ is not present (NO in step S25), the extended link generation ends, and the processing returns to step S22, where a new extended link ID $e_{i+1}$ is set. When it is determined that an unexamined original link adjacent to the tail element of the extended link $e_i$ is present (YES in step S25), an unexamined original link adjacent to the tail element of the extended link $e_i$ is added to the last of the extended link $e_i$ (step S26). When a plurality of unexamined original links adjacent to the tail element of the extended link $e_i$ are present, one original link with the smallest predictive error rate is selected. Alternatively, when a plurality of adjacent links is present, selection may be randomly made or may be made according to other rule.

Figure 9C:
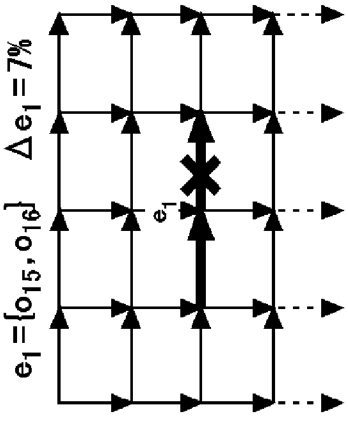

FIG. 9C illustrates that an original link $o_{16}$ with the smallest error rate is selected from among the original links adjacent to the tail element $o_{15}$ of the extended link $e_1$ and is added as the tail element of the extended link $e_1$.

In step S26, when a new original link is added to the tail of the extended link $e_i$, a predictive error rate $\Delta e_i$ is calculated for the extended link added with the original link (step S27). Specifically, the predicted value of the traveling time of the extended link $e_i$ is calculated from the true value of the extended link $e_i$ (a total value of the actual traveling times of the original links configuring the extended link $e_i$). The predicted value of the extended link $e_i$ can be calculated from the true value of the extended link $e_i$ similarly as the predicted value of the original link is calculated in step S21. Then, an error rate between a value obtained by dividing the predicted value of the extended link $e_i$ by the link length of each original link or the average link traveling time, and a true value of each original link is calculated, and an average value of the predictive error rates is assumed as an error rate of the extended link $e_i$. Typically, a predictive error rate closer to the actual value can be calculated by dividing the predicted value of the extended link and then calculating an error rate relative to the true value of the original link, but a predictive error rate relative to the true value of the extended link $e_i$ may be employed without dividing the predicted value of the extended link $e_i$.

A determination is made as to whether the predictive error rate of the extended link $e_i$ calculated in step S27 is more increased than the predictive error rate of the seed link of the extended link or the predictive error rate previously calculated for the extended link (step S28). An increase in the predictive error rate indicates deterioration in the predictive accuracy for the extended link $e_i$, and thus it is not preferable that the original link newly added in step S26 is employed as an element of the extended link $e_i$. When the predictive error rate increases (YES in step S28), the original link as a cause of the increase in the error rate is discarded from the extended link $e_i$ (step S29), and the processing returns to step S25. To the contrary, when the predictive error rate does not increase (NO in step S28), the processing returns to step S25.

Figure 9D:
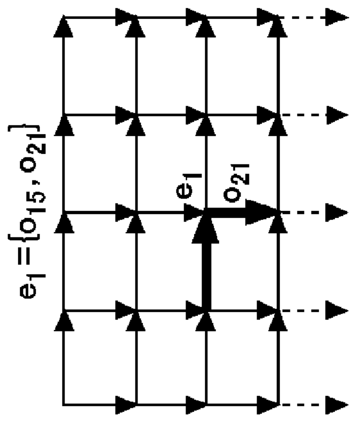
Figure 9E:
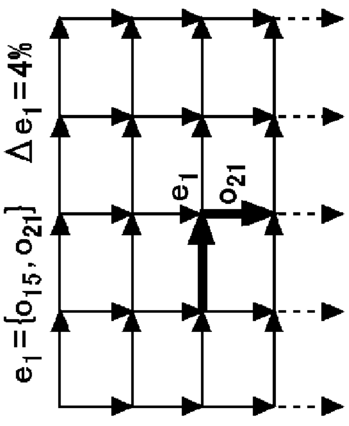
Figure 9F:
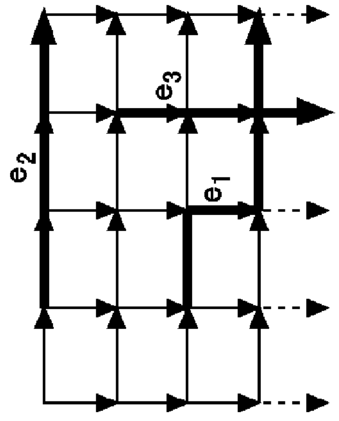

In the examples of FIGS. 9A to 9F, an original link $o_{16}$ is temporarily added to the tail of the extended link $e_1$ in FIG. 9C, but the predictive error rate of the extended link $e_1$ is 7% in this state, and more increases than the error rate 5% of the seed link $o_{15}$. Thus, as illustrated in FIG. 9D, the original link $o_{16}$ is discarded from the tail of the extended link $e_1$, and other unexamined adjacent link $o_{21}$ is newly added to the extended link $e_1$. Assuming that the predictive error rate of the extended link $e_1$ added with the original link $o_{21}$ is 4%, the error rate is further reduced than the extended link $e_1$ is configured of only the original link $o_1$ as a seed link, and thus, as illustrated in FIG. 9E, the original link $o_{21}$ is not discarded and is decided to be an element of the extended link $e_1$, and then a determination is made by the same routine as to whether to add an unexamined link adjacent to $o_{21}$. The processing is repeated so that the extended links are sequentially generated and all the original links are replaced with the extended links as illustrated in FIG. 9F.

In the present embodiment, a predicted value and a predictive error are calculated based on a true value of a past traveling time per original link for generating an extended link. Thus, the extended link generation is also reconsidered as needed along with update of the original link traffic data storage unit 103.

As described above, in the present embodiment, the original links are combined to generate the extended link in order to reduce the predictive error rate, thereby realizing a highly-reliable prediction even when the amount of calculations for prediction is reduced.

The same method as the extended link generation method may be applied to decision of a predictive cycle in the predictive cycle decision unit 107 or a time interval for calculating a predicted value of a link traveling time. In the present embodiment, the predictive cycle decision unit 107 may define a predictive cycle such that a predictive error rate is reduced per extended link. Thereby, a time interval for prediction is increased to 10 minutes, for example, and reliability of the prediction is ensured and the number of predictions is decreased, thereby further reducing the amount of calculations. A traveling time of the extended link may be predicted at five-minute intervals along with update of the original link traffic data storage unit 103.

Figure 10:
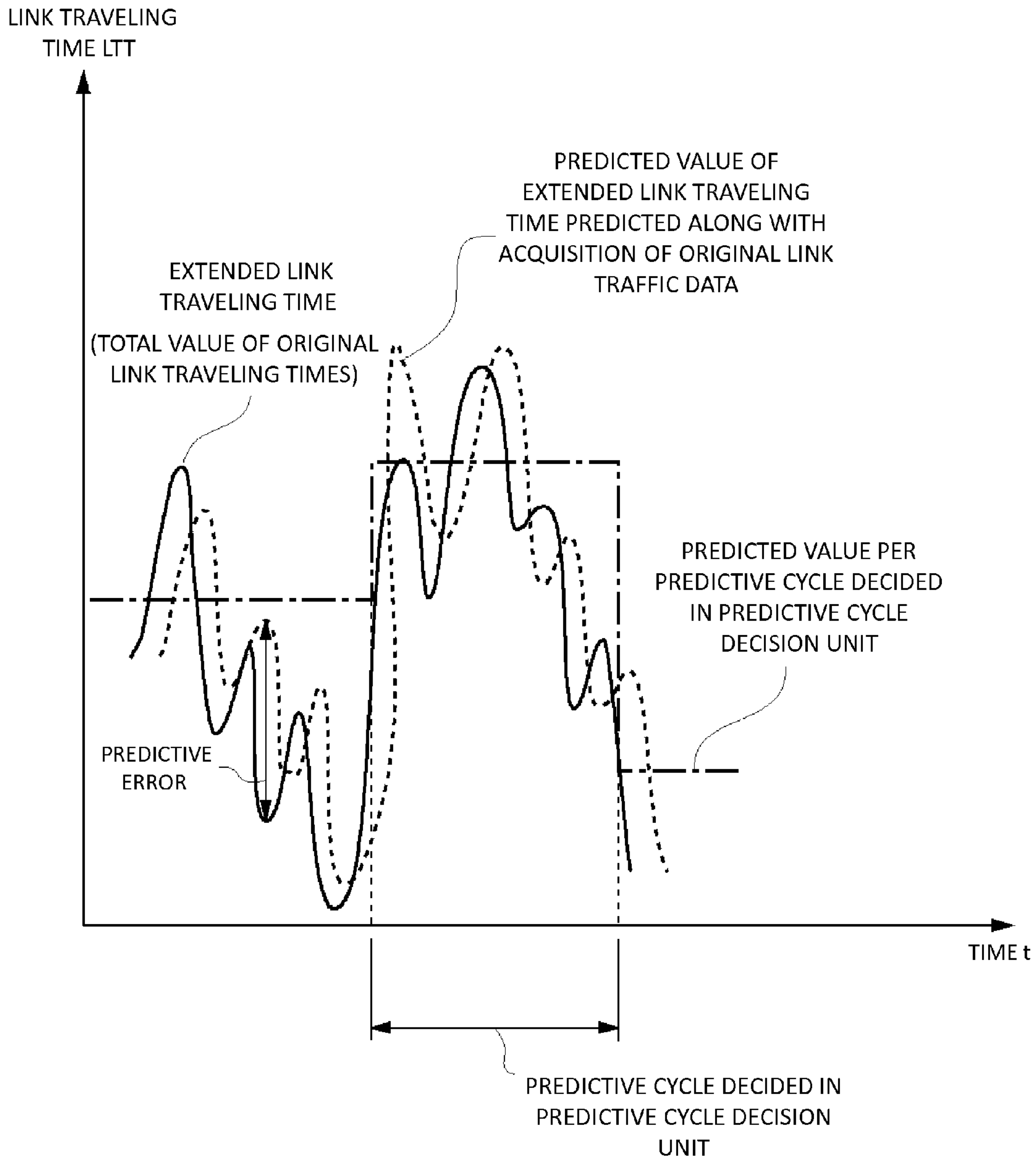
FIG. 10 is a diagram for explaining an operation of deciding a predictive cycle by a predictive cycle decision unit according to the embodiment of the present invention.

It is effective that a predictive time interval is increased for predicting traffic data with a high accuracy when traffic data from a probe car is acquired for prediction. As illustrated in FIG. 10, when a temporal change in an original link traveling time acquired from the traffic data distribution center 20 is large, a variation in a predicted value based thereon is also large, and accordingly a large error easily occurs between a true value and a predicted value. In this case, when the time interval for the predicted value is increased, a rapid variation in traffic data can be absorbed, and an error can be reduced.

In this way, the predictive error can be expected to decrease even if the predictive time interval is only increased. In the present embodiment, the predictive cycle is changed to simulate the predictive accuracy, thereby predicting the traffic data with a higher accuracy.

The simulation of the predictive accuracy in the predictive cycle decision unit 107 is decided by calculating a predictive error rate when a predictive cycle is variously changed to predict extended link traffic data, and employing a predictive cycle with the smallest predictive error rate. More specifically, the following processing will be performed. That is, the traveling time per extended link, which is stored in the extended link traffic data storage unit 106, is read, and an elapsed time from the time corresponding to the last true value used for calculating the predicted value is changed, such as a traveling time predicted value at five minutes later, a traveling time predicted value at 10 minutes later, a traveling time predicted value at 15 minutes later, . . . , and the like, thereby sequentially calculating the predicted value and the predictive error rate. The predictive error rate can be calculated similarly as the predictive error rate is calculated in the extended link generation. This is kept while the predictive error rate is being lowered, and the cycle is decided such that the elapsed time corresponding to the calculated smallest predictive error is a predictive time interval.

As described above, with the traffic data prediction device 10 according to the present embodiment, the extended link generation unit 104 generates an extended link by combining original links associated with traveling time data per original link acquired from the traffic data distribution center 20 by use of a predictive error rate per original link, and the extended link traffic data prediction unit 108 calculates a predicted value of a traveling time per extended link, thereby reducing the amount of calculations for predicting the traveling time, and calculating predicted data with high reliability.

The embodiment according to the present invention has been described above by way of examples, but the scope of the present invention is not limited thereto, and may be changed and modified according to the purpose within the scope described in claims.

For example, there has been described above the case in which traffic data to be provided is predicted in response to a request from the terminal device such as car navigation device, but traffic data may be predicted in a terminal device having the same structure as the traffic data prediction device 10.

There has been described above the case in which traffic data acquired from the traffic data distribution center 20 and stored in the original link traffic data storage unit and traffic data to be predicted is a link traveling time per extended link, but other traffic data such as link traveling time may be acquired to predict a link traveling time per extended link, or other traffic data may be predicted. Alternatively, other traffic data may be predicted from original link traveling time data.

There has been described above the case in which an extended link is generated by sequentially combining adjacent original links, but an extended link may be generated by combining non-adjacent original links, and an extended link may be decided from among extended link candidates based on calculated predictive error rates of the extended link candidates previously combining original links.

The preferred embodiment according to the present invention which is possible at present has been described above, but various modifications may be made to the present embodiment, and all the modifications within the spirit and scope of the present invention are encompassed in the scope of the attached claims.

The present invention has an advantage that the amount of calculations for predicting traffic data such as link traveling time can be reduced, and is effective as a traffic data prediction device and the like for predicting traffic data in a road section.

REFERENCE SIGNS LIST

10 TRAFFIC DATA PREDICTION DEVICE
101 COMMUNICATION UNIT
102 ORIGINAL LINK MAP DATA STORAGE UNIT
103 ORIGINAL LINK TRAFFIC DATA STORAGE UNIT
104 EXTENDED LINK GENERATION UNIT
105 EXTENDED LINK MAP DATA STORAGE UNIT
106 EXTENDED LINK TRAFFIC DATA STORAGE UNIT
107 PREDICTIVE CYCLE DECISION UNIT
108 EXTENDED LINK TRAFFIC DATA PREDICTION UNIT
109 EXTENDED LINK PREDICTED TRAFFIC DATA STORAGE UNIT
110 EXTENDED LINK DIVISION UNIT
111 ORIGINAL LINK PREDICTED TRAFFIC DATA STORAGE UNIT
20 TRAFFIC DATA DISTRIBUTION CENTER
30 TERMINAL DEVICE

What is claimed is:

1. A traffic data prediction device comprising:

an original link traffic data storage unit for storing traffic data per original link as a predetermined road link;

an extended link generation unit for generating an extended link from the original links; and an extended link traffic data prediction unit for predicting traffic data per extended link generated in the extended link generation unit by use of traffic data per original link, wherein the extended link generation unit decides the original links for generating the extended link based on data indicating a predictive accuracy of traffic data in a combined link combining the selected original links, and generates the extended link made of the decided original links as elements.

2. The traffic data prediction device according to claim 1, wherein the extended link traffic data prediction unit predicts traffic data per extended link based on traffic data per extended link calculated by use of the original link traffic data corresponding to the original links as the elements of the generated extended link.

3. The traffic data prediction device according to claim 1, further comprising:

an extended link division unit for dividing the traffic data per extended link predicted in the extended link traffic data prediction unit and assigning the divided traffic data to each of the original links as the elements of the extended link.

4. The traffic data prediction device according to claim 3, wherein the extended link division unit divides traffic data per extended link predicted in the extended link traffic data prediction unit according to an attribute value of each of the original links as the elements of the extended link.

5. The traffic data prediction device according to claim 1, wherein the extended link generation unit predicts traffic data in the combined link thereby to calculate data indicating a predictive accuracy of the traffic data in the combined link.

6. The traffic data prediction device according to claim 5, wherein the extended link generation unit predicts traffic data in the combined link by use of traffic data per combined link calculated by use of traffic data of the original links configuring the combined link.

7. The traffic data prediction device according to claim 1, wherein the extended link generation unit selects the original links configuring the combined link based on data indicating a predictive accuracy of the traffic data per original link.

8. The traffic data prediction device according to claim 1, wherein the combined link is configured of the adjacent original links sequentially selected and combined.

9. The traffic data prediction device according to claim 8, wherein the extended link generation unit calculates data indicating a predictive accuracy of the traffic data in the combined link whenever the selected original link is newly combined, and when the predictive accuracy of the traffic data does not lower in the combined link, decides the newly-combined original link as the original link for generating the extended link.

10. The traffic data prediction device according to claim 1, further comprising:

a predictive cycle decision unit for deciding a cycle at which the traffic data per extended link is to be predicted, wherein the extended link traffic data prediction unit predicts traffic data per extended link at the cycle decided in the predictive cycle decision unit.

11. The traffic data prediction device according to claim 10, wherein the predictive cycle decision unit decides the cycle based on data indicating a predictive accuracy when traffic data per extended link is predicted at a different cycle.

12. A traffic data prediction method comprising the steps of:

generating an extended link from original links as predetermined road links; and predicting traffic data per extended link generated in the step of generating an extended link by use of traffic data per original link acquired from an original link traffic data storage unit storing traffic data per original link therein, wherein the step of generating an extended link decides the original links for generating the extended link based on data indicating a predictive accuracy of traffic data in a combined link combining the selected original links, and generates the extended link made of the decided original links as elements.

13. A computer-readable storage medium storing a program for causing a computer to execute the traffic data prediction method according to claim 12.

* * * * *